United States Patent
Ferrer et al.

(10) Patent No.: US 10,384,802 B2
(45) Date of Patent: Aug. 20, 2019

(54) REAL TIME GALLEY POWER MANAGEMENT AND FAULT MONITORING SYSTEM

(71) Applicant: The Boeing Company, Chicago, IL (US)

(72) Inventors: Alberto Ferrer, Bothell, WA (US); Anil Kumar, Sammamish, WA (US); Kesav R. Rayaprolu, Kirkland, WA (US)

(73) Assignee: The Boeing Company, Chicago, IL (US)

(*) Notice: Subject to any disclaimer, the term of this patent is extended or adjusted under 35 U.S.C. 154(b) by 374 days.

(21) Appl. No.: 15/047,830

(22) Filed: Feb. 19, 2016

(65) Prior Publication Data

US 2017/0240295 A1    Aug. 24, 2017

(51) Int. Cl.
*B64D 11/00* (2006.01)
*B64D 47/00* (2006.01)
*B64D 11/04* (2006.01)

(52) U.S. Cl.
CPC ............ *B64D 47/00* (2013.01); *B64D 11/04* (2013.01)

(58) Field of Classification Search
None
See application file for complete search history.

(56) References Cited

U.S. PATENT DOCUMENTS

| | | | |
|---|---|---|---|
| 6,934,137 B2 | 8/2005 | Elliott et al. | |
| 8,321,073 B2 | 11/2012 | McAvoy | |
| 8,686,876 B2 * | 4/2014 | Shiomori | B64D 11/0015 244/117 R |
| 2005/0121978 A1 | 6/2005 | McAvoy et al. | |
| 2009/0103221 A1 * | 4/2009 | Aronson | H02J 3/14 361/93.2 |
| 2010/0029190 A1 * | 2/2010 | Dessero | B64D 13/08 454/76 |
| 2011/0238742 A1 * | 9/2011 | Birkmann | G08C 17/02 709/203 |
| 2013/0248652 A1 * | 9/2013 | Godecker | B64D 11/04 244/118.5 |
| 2014/0028189 A1 | 1/2014 | Eckel et al. | |
| 2015/0067134 A1 | 3/2015 | Birkmann et al. | |
| 2016/0063653 A1 * | 3/2016 | Sutton | G06Q 50/14 705/17 |

OTHER PUBLICATIONS

European Search Report dated May 12, 2017 from co-pending EP Patent Application No. 17156633.4.
Office Action dated Sep. 28, 2018 from co-pending EP Patent Application No. 17156633.4.

* cited by examiner

*Primary Examiner* — Cassandra F Cox
(74) *Attorney, Agent, or Firm* — Joseph M. Rolnicki; Evans & Dixon, L.L.C.

(57) ABSTRACT

A real-time galley power management and fault monitoring system for an aircraft manages a status of power consumption of a plurality of galley inserts inside a galley complex of an aircraft and monitors fault status of each galley insert of the plurality of galley inserts.

20 Claims, 1 Drawing Sheet

REAL TIME GALLEY POWER MANAGEMENT AND FAULT MONITORING SYSTEM

FIELD

This disclosure pertains to a power management and fault monitoring system for galley complexes in an aircraft.

BACKGROUND

In an aircraft having several galley complexes, the several galley complexes are allocated a predetermined amount of power generated by the aircraft. This predetermined amount of power is shared by the several galley complexes.

Because there is a set amount of power to be shared by the several galley complexes, this set amount of power must be managed so that the inserts (microwave ovens, coffee makers or water heaters, galley cart chillers, etc.) of each galley complex are provided with power in an orderly sequence when needed.

The orderly sequence in which electric power is allocated to a particular insert of a particular galley complex is typically determined by a flight attendant working in each galley complex of the several galley complexes. A flight attendant is needed at each galley complex to turn on the inserts (I.e., microwave ovens, coffee makers or water heaters, galley cart chillers, etc.) to attend to the passengers being served by each of the galley complexes.

The current system of managing power between several galley complexes of an aircraft is disadvantaged in that it requires extra wiring to implement the wired galley network system. The weight and the space requirements of the wired communication bus that communicates all of the galley complexes adds weight to the aircraft and detracts from the volume of the aircraft cabin occupied by the passengers, which detracts from the efficient operation of the aircraft and detracts from the comfort of the passengers in the aircraft cabin.

SUMMARY

The real time galley power management and fault monitoring system of this disclosure overcomes the disadvantages associated with multiple galley complexes in an aircraft that communicate with each other and with the airplane through a wired communication bus. The system also overcomes the disadvantages associated with the need for flight attendants to be in each of the galley complexes of the aircraft to communicate requests for electric power and allocate electric power allowances to each of the galley complexes in a prioritized sequence determined by the flight attendants. A wireless system would also permit a flight attendant to set the priorities from a centralized on board computerized interface. The flight attendant would allocate priorities, the airplane and the power management logic would then translate those priorities into electric power allowances.

The real time galley power management and fault monitoring system of this disclosure includes a network server on a wireless infrastructure that is provided inside the aircraft. The network server is programmed with a power management algorithm. The algorithm consists of a priority based logic that allows and denies inserts of the galley complexes to come online.

The system also includes several wireless galley control units acting as nodes on the wireless infrastructure. A wireless galley control unit (wGCU) is provided in each one of several galley complexes of the aircraft. Each wireless galley control unit is provided in one of several galley complexes of the aircraft. Each wGCU communicates with the inserts (i.e., microwave ovens, coffee makers or water heaters, galley cart chillers, etc.) of its associated galley complex and monitors the status and controls the operation of the inserts. The wireless galley unit would communicate with the inserts via a wired connection or potentially a wireless connection as well. Additionally, the wireless galley control unit communicating with the inserts of its associated galley complex monitors the operational health of each insert of the galley complex and also monitors for faults in each insert of the galley complex.

Each galley complex is also provided with a cabin attendant control panel display that are used to display a graphical user interface configuration screen to the flight attendants of the galley complexes. The panel displays enable the flight attendants to select a desired galley insert priority for the particular galley complex. The panels also enable the flight attendants to view faults and operational statuses of the inserts of the galley complex.

The wireless galley control unit at each galley complex also communicates with the wireless network server of the aircraft. The wireless galley control unit receives power data available to the galley complex from the network server. The wireless galley control unit also transmits back to the network server periodic status and fault messages of the inserts of the galley complex. The wireless transmitter coupled with the control unit eliminates the need for a hard wire communication bus from the network server to the control units of the galley complexes.

The features, functions, and advantages that have been discussed can be achieved independently and in various embodiments or may be combined in yet other embodiments, further details of which can be seen with reference to the following description and drawings.

DESCRIPTION

Figure 1:
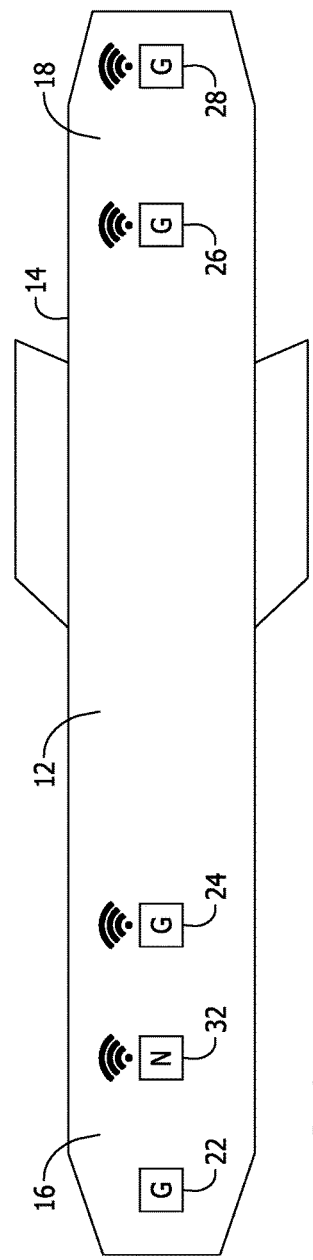
FIG. 1 is a representation of an aircraft and the positioning of a network server and several wireless galley control units in the several galley complexes of the aircraft.

FIG. 1 is a representation of an aircraft cabin interior 12 inside the fuselage 14 of an aircraft. As represented in FIG. 1, the forward area 16 of the aircraft interior 12 is to the left in the drawing figure and the rearward area 18 of the aircraft interior 12 is to the right in the figure. Although no seating is represented, the aircraft interior 12 represented in FIG. 1 is the interior of a passenger aircraft. As is typical, passengers traveling in the aircraft interior 12 are serviced by flight attendants.

The aircraft interior 12 is provided with several galley complexes 22, 24, 26, 28. In FIG. 1, four galley complexes 22, 24, 26, 28 are represented. The galley complexes 22, 24, 26, 28 are used by the flight attendants in providing services to the passengers traveling in the aircraft interior 12. Although there are four galley complexes 22, 24, 26, 28 represented in FIG. 1, the aircraft interior 12 could be provided with more galley complexes, or could be provided with fewer galley complexes.

A wireless network server 32 is programmed with a custom algorithm. The algorithm manages requests for power received from the galley complexes 22, 24, 26, 28 and allocates electric power allowances to each of the galley complexes. The programmed algorithm of the network server 32 also prioritizes requests for power based on logic to allow inserts (microwave ovens, coffee makers or water heaters, galley cart chillers, etc.) to come online or deny the galley inserts online.

The wireless network server 32 also has a memory. The memory records statuses of inserts in the galley complexes 22, 24, 26, 28 and records fault messages received from inserts.

Figure 2:
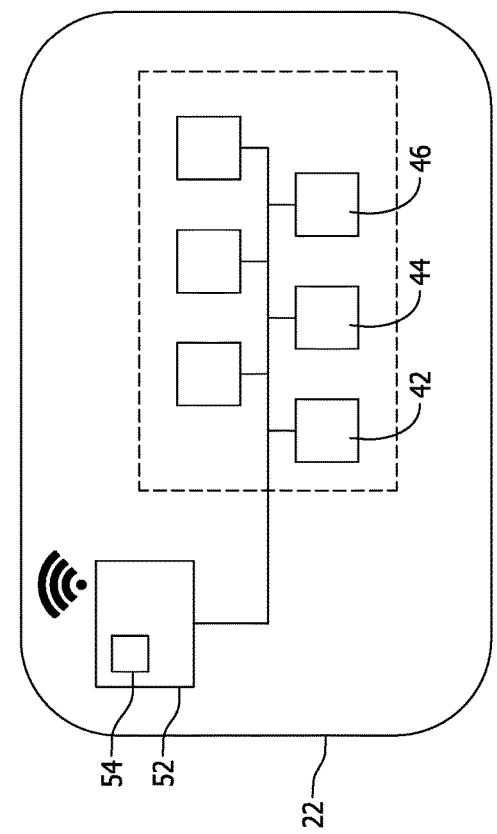
FIG. 2 is a representation of a galley complex and a wireless galley control unit communicating with the inserts of the galley complex.

FIG. 2 is a representation of each of the galley complexes, 22, 24, 26, 28. The galley complex 22 represented in FIG. 2 includes the typical galley inserts (i.e., microwave ovens 42, coffee makers or water heaters 44, galley cart chillers 46, etc.). Each of the inserts 42, 44, 46 is an ARINC-812 insert. ARINC-812 inserts are designed for easy configurability by airlines, high interoperability between different aircraft types, and with high requirements on power management.

Each of the galley complexes 22, 24, 26, 28 as represented by the galley complex 22 in FIG. 2 is also provided with a wireless galley control unit 52. As represented in FIG. 2, the wireless galley control until 52 communicates with the galley inserts 42, 44, 46, etc. The control unit 52 wirelessly communicates with the inserts 42, 44, 46, etc. Additionally, the control unit 52 communicates only with the inserts 42, 44, 46, etc. of its galley complex 22. Although it is preferred that the control unit 52 communicates wirelessly with the galley inserts 42, 44, 46, etc. of its galley complex 22, the control unit 52 could also communicate with the inserts 42, 44, 46, etc. through a wiring bus.

The communication of the control unit 52 with its associated inserts 42, 44, 46, etc. controls selective operation of the inserts by providing power to a selected insert. Additionally, the communication of the control unit 52 with its associated inserts 42, 44, 46, etc. receives status information from the inserts and fault messages from the inserts.

The wireless galley control unit 52 in each of the galley complexes, 22, 24, 26, 28 is provided with a control panel 54 that is useable by a cabin attendant to control operation of the wireless galley control unit 52. The control panel 54 has a display screen that displays to the attendant graphical status information on each of the galley inserts 42, 44, 46, etc. such as an "on" or "off" condition of the insert, the rate of power usage of the insert, any faults associated with the insert, etc. The control panel 54 also enables control of the wireless galley control unit 52 to prioritize which of the galley inserts 42, 44, 46, etc. is to come online and when that insert is to come online.

In addition to controlling the operation of the galley inserts 42, 44, 46, the wireless galley control unit 52 also communicates with the network server 32. The wireless galley control unit communicates wirelessly with the network server 32. The control unit 52 receives electric power data from the network server 32. The control unit 52 also transmits information to the network server 32. The control unit 52 transmits galley insert status information to the network server 32, such as whether a particular galley insert 42, 44, 46, etc. is in its "on" or "off" condition, power usage by any of the particular galley inserts, etc. The control unit 52 also transmits inventory information to the network server 32, such as the number and type of beverages and other goods needing replenishment. The information transmitted by the wireless galley control unit 52 to the network server 32 can be transmitted periodically, or in real time. The wireless galley control unit 52 also transmits any fault information received from any of the inserts 42, 44, 46, etc. to the wireless network server 32. The memory of the wireless network server 32 records the status information and fault information on any of the galley inserts 42, 44, 46, etc. transmitted by the galley control unit 52. This recorded information can then be later used when the aircraft is being serviced to identify which, if any of the galley inserts 42, 44, 46, etc. requires servicing or replacement. The recorded information can also be used to restock the galley complex 22.

The galley power management and fault monitoring system comprised of the wireless network server 32 and the wireless galley control units 52 in each of the galley complexes 22, 24, 26, 28 combine to improve galley operation and fault monitoring. The power management serves to mitigate disruptive load shedding events in the galley complexes 22, 24, 26, 28 initiated by the electrical power system of the aircraft that can lead to loss of electric power to the galley complexes and a disruption to flight attendants and passenger services. The wireless network server 32 combined with the wireless galley control units 52 in each of the galley complexes 22, 24, 26, 28 eliminate the need for hard wiring from the aircraft equipment centers to the galley complexes. The wireless implementation eliminates wiring the infrastructure on the aircraft fuselage.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A real-time galley power management and fault monitoring system for an aircraft, the system comprising:
    a network server in an interior of the aircraft;
    a plurality of separate galley complexes in the interior of the aircraft, the network server being separate from each galley complex of the plurality of galley complexes; and,
    a wireless galley control unit inside each galley complex in the interior of the aircraft, each wireless galley control unit inside each galley complex being configured for wireless communication with the network server.

2. The system of claim 1, further comprising:
    each wireless galley control unit inside each galley complex being configured for communication with a plurality of galley inserts inside the galley complex and not communicate with other galley inserts inside other galley complexes of the plurality of galley complexes.

3. The system of claim 2, further comprising:
    the galley inserts being ARINC-812 inserts.

4. The system of claim 2, further comprising:
    each wireless galley control unit inside each galley complex being configured for wireless communication with the inserts in the galley complex.

5. The system of claim 2, further comprising:
    each wireless galley control unit inside each galley complex being configured to control operation of the plurality of galley inserts inside each galley complex.

6. The system of claim 5, further comprising:
the network server being configured to allocate electric power to each wireless galley control unit and to the plurality of galley inserts under the control of each wireless galley control unit.

7. The system of claim 2, further comprising:
each wireless galley control unit being configured to communicate status information and fault information of the plurality of galley inserts under the control of each wireless galley control unit to the network server.

8. The system of claim 7, further comprising:
the network server having a memory that records status information and fault information communicated to the network server by each wireless galley control unit.

9. The system of claim 2, further comprising:
each wireless galley control unit having a display screen that is configured to display status information and fault information for each galley insert under the control of each wireless galley control unit of the plurality of galley inserts on the display screen.

10. A real-time galley power management and fault monitoring system for an aircraft, the system comprising:
a network server in an interior of the aircraft; and,
a plurality of wireless galley control units, each wireless galley control unit of the plurality of wireless galley control units being inside a separate galley complex in the interior of the aircraft, each wireless galley control unit of the plurality of wireless galley control units being configured for wireless communication with the network server.

11. The system of claim 10, further comprising:
each wireless galley control unit being configured for communication with a plurality of galley inserts inside the galley complex.

12. The system of claim 11, further comprising:
the galley inserts being ARINC-812 inserts.

13. The system of claim 11, further comprising:
the wireless galley control unit being configured for one of wireless communication with the inserts in the galley complex and wired communication with the inserts in the galley complex.

14. The system of claim 11, further comprising:
the wireless galley control unit being configured to control operation of the plurality of galley inserts.

15. The system of claim 10, further comprising:
the network server being configured to allocate electric power to each wireless galley control unit of the plurality of wireless galley control units.

16. The system of claim 11, further comprising:
each wireless galley control unit of the plurality of wireless galley control units being configured to communicate status information and fault information of the plurality of galley inserts with the network server either upon request by an application hosted on the network server or whenever the wireless galley control unit detects exceedance in observed parameters related to the wireless galley control unit within a local network.

17. The system of claim 16, further comprising:
the network server having a memory that records status information and fault information communicated to the network server by the plurality of wireless galley control units.

18. The system of claim 11, further comprising:
each wireless galley control unit having a display screen that is configured to display status information and fault information for each galley insert of the plurality of galley inserts on the display screen.

19. A method of real-time galley power management and fault monitoring for an aircraft, the method comprising;
communicating a plurality of wireless galley control units inside a plurality of separate galley complexes in an interior of the aircraft with a network server in the interior of the aircraft, the network server being separate from the plurality of separate galley complexes and not in the galley complexes; and,
programming the network server with a custom algorithm that manages requests for power received from the wireless galley control unit and allocates electric power to the wireless galley control unit and accepts power management requests from other systems of the aircraft.

20. The method of claim 19, further comprising:
programming the network server with a custom algorithm that manages requests for power received from the plurality of galley complexes and allocates electric power to each of the galley complexes and also records statuses of the galley complexes and records statuses of galley inserts within the galley complexes.

* * * * *